May 18, 1937. E. BAKER 2,081,080
PATTIE MOLD
Filed June 15, 1936
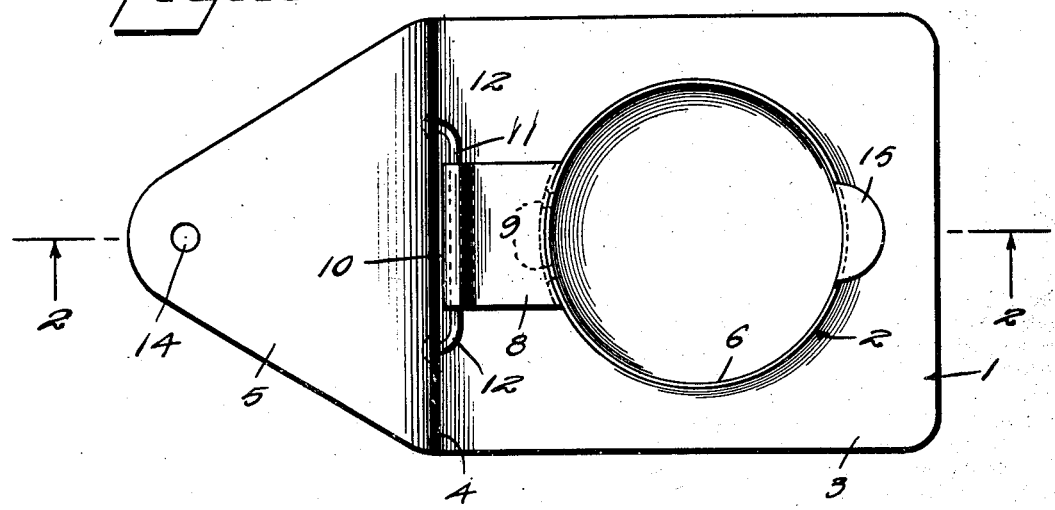
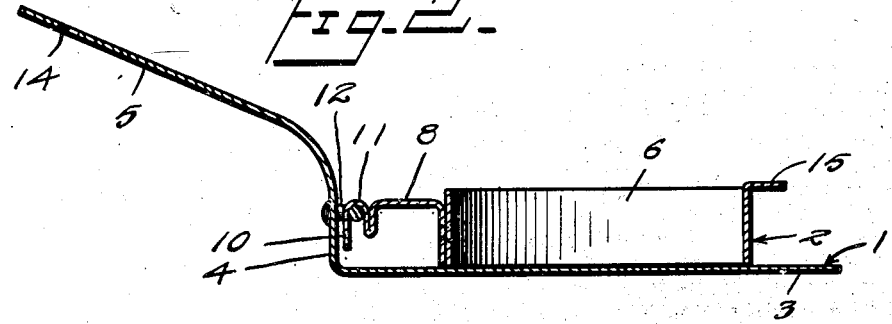
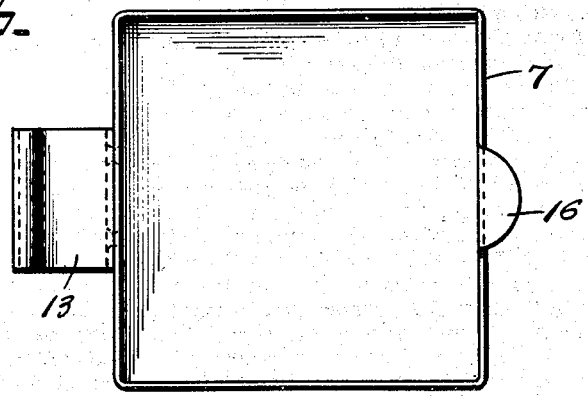
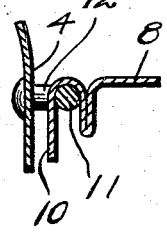
Edwin Baker
INVENTOR
BY Victor J. Evans & Co.
ATTORNEYS Patented May 18, 1937

2,081,080

UNITED STATES PATENT OFFICE 2,081,080

PATTIE MOLD

Edwin Baker, Winn, Maine

Application June 15, 1936, Serial No. 85,379

4 Claims. (Cl. 107—19)

My invention relates to kitchen utensils and more particularly to improvements in meat cake molds.

The principal object of my invention is to provide an inexpensive, practical utensil for molding and cooking meat cakes, or patties, and the like, of different shapes for use in sandwiches and without the hands coming in contact with the cakes during the molding and cooking operations.

Another object is to provide a device of the character and for the purpose above set forth combining a mold and a peel or scoop, and which may be used either as a cooking or a molding utensil or as a peel for use in turning cakes or in similar capacities.

Still another object is to provide a utensil for molding and cooking meat cakes of different shapes but containing the same amount of meat in each instance.

Other objects, together with the precise nature of my improvements, will be readily understood as the following description proceeds and upon reference to the accompanying drawing.

In said drawing:

Figure 1 is a view in top plan of a utensil embodying my improvements in their preferred form.

Figure 2 is a view in longitudinal section taken on the line 2—2 of Figure 1 looking in the direction indicated by the arrows.

Figure 3 is a view in top plan of a modification of the invention, and

Figure 4 is a fragmentary view in transverse section illustrating details of a hinge connection, and presently described in detail.

Referring to the drawing by numerals, the utensil of my invention comprises a peel, or scoop, 1, and a mold member 2 hinged to the member 1 for vertical swinging movement thereon.

The peel member 1 comprises a flat, preferably rectangular, blade part 3 having an upstanding right-angled flange 4 extending across the rear edge thereof and a flat, substantially triangular handle 5 extending obliquely from the upper edge of the flange 4.

The mold member 2 comprises an open frame 6, preferably annular in form, as shown in Figures 1 and 2 and adapted to seat at its lower edges on the blade part 3.

A mold member 7 of rectangular form, as shown in Figure 3, may be substituted for the mold member 2, these members being interchangeable, as will presently more clearly appear. The mold members 2 and 7 are both preferably smaller than the blade part 3 and centered relative thereto, so that particles of the food being cooked and falling out of the said molds will be caught upon the blade part 3. Mold member 2 is hinged to the peel member 1 by means of a rearwardly extending hinge leaf 8 riveted to said member, as indicated at 9, and having a rear hooked edge portion 10 designed to take over a rod 11 having bent ends 12 riveted to the flange 4 so that the rod 11 extends forwardly of said flange. The molds 2 and 7 may be provided with front tabs 15 and 16, respectively, for swinging the same on the rod 11. The mold member 7 is provided with a hinge leaf 13 similar to the leaf 8. The handle part has the usual aperture 14 therein for suspending the utensil when not in use.

The peel member 1 and the mold members 2 and 7, together with the hinge leaves 8 and 13, may be formed of any metal suitable for cooking purposes, preferably aluminum.

When using the described utensil, the mold members 2 or 7, as the case may be, may be filled and packed with a knife, thereby obviating the handling of the same. In this connection it is to be noted that the members 2 and 7 are designed to contain substantially the same amount of meat or other materials to be cooked into cake form. The molds 2 and 7 may be interchanged according to the shape of the cake or patty desired, by merely lifting the one off the rod 11 and substituting the other.

A utensil constructed as above described is easy to handle, adapted to conserve food, is readily cleaned, and provides a medium of cooking meat, patties or cakes, under more sanitary conditions than those usually obtaining.

Obviously the molds 2 and 7 may be made in shapes other than those described and other details described may be varied without departing from the inventive concept disclosed.

What I claim is:

1. A utensil of the class described comprising, a peel member having a flat blade, and a mold member hinged thereto to seat on the blade and for swinging movement away from the same in a plane at right angles to the surface of the peel member.

2. A utensil of the class described comprising, a flat blade, and a mold member open at its top and bottom, hinged to said peel member, to seat at its bottom edges on said blade and for swinging movement away from the same in a plane at right angles to the surface of the peel member.

3. A utensil of the class described comprising, a peel member having a flat blade formed at its rear end with an upstanding flange and a handle extending from the upper edge of said flange, and a mold member open at its top and bottom and hinged to said flange to seat at its bottom edges on said blade and for swinging movement away from the same.

4. A utensil of the class described comprising, a peel member having a flat blade formed at its rear end with an upstanding flange and a handle extending from the upper edge of said flange, and a mold member smaller than the blade, open at its top and bottom and adapted to seat at its lower edges on said blade, and a hinge connection between said mold member and flange comprising a rod secured to said flange to extend forwardly thereof, and a hinge leaf extending from said mold member and having a hooked edge taking over said rod.

EDWIN BAKER.